(12) United States Patent
Rooshenas

(10) Patent No.: US 6,881,768 B2
(45) Date of Patent: Apr. 19, 2005

(54) WATER-BASED EPOXY GROUT

(75) Inventor: Rezvan Rooshenas, Hamden, CT (US)

(73) Assignee: Laticrete International, Inc., Bethany, CT (US)

( * ) Notice: Subject to any disclaimer, the term of this patent is extended or adjusted under 35 U.S.C. 154(b) by 0 days.

(21) Appl. No.: 10/339,148

(22) Filed: Jan. 9, 2003

(65) Prior Publication Data

US 2004/0134163 A1 Jul. 15, 2004

(51) Int. Cl.$^7$ .......................... C08K 3/36; C08L 23/06; C08L 63/02; C08L 83/04; E04G 21/02
(52) U.S. Cl. .................. 523/427; 52/742.16; 523/403; 523/434; 523/465
(58) Field of Search ............... 52/742.16; 523/402, 523/403, 404, 406, 414, 417, 465, 427, 434

(56) References Cited

U.S. PATENT DOCUMENTS

| | | | |
|---|---|---|---|
| 3,967,429 A | 7/1976 | Weiant et al. ................ 52/744 |
| 4,021,257 A | 5/1977 | Bernett | |
| 4,059,551 A | 11/1977 | Weiant et al. | |
| 4,418,166 A | 11/1983 | Chesney, Jr. et al. ....... 523/400 |
| 4,447,267 A | 5/1984 | Chesney, Jr. et al. ......... 106/93 |
| 5,017,632 A | 5/1991 | Bredow et al. ............. 523/400 |
| 5,246,984 A | 9/1993 | Darwen et al. ............. 523/404 |
| 5,350,784 A | 9/1994 | Darwen et al. ............. 523/404 |
| 5,362,322 A | * 11/1994 | Johansen et al. ........... 106/802 |
| 5,475,039 A | 12/1995 | Bütikofer .................... 523/404 |
| 5,489,630 A | 2/1996 | Walker | |
| 5,508,324 A | 4/1996 | Cook .......................... 523/404 |
| 5,527,839 A | 6/1996 | Walker ....................... 523/404 |
| 5,536,775 A | 7/1996 | Curatolo et al. ............ 525/530 |
| 5,569,696 A | 10/1996 | Abramson et al. ......... 524/487 |
| 5,576,416 A | 11/1996 | Walker ....................... 528/340 |
| 5,596,030 A | 1/1997 | Walker ....................... 523/404 |
| 5,599,855 A | 2/1997 | Walker ....................... 523/404 |
| 5,618,905 A | 4/1997 | Marsella et al. ............ 528/123 |
| 5,621,025 A | 4/1997 | Toerner et al. ............. 523/444 |
| 5,746,935 A | * 5/1998 | Corley et al. .......... 252/182.23 |
| 5,854,312 A | * 12/1998 | Klippstein ................. 523/404 |

FOREIGN PATENT DOCUMENTS

| | | | | |
|---|---|---|---|---|
| EP | 586782 A1 | * | 3/1994 | .......... C04B/26/14 |
| JP | 09194686 A | * | 7/1997 | .......... C08L/63/00 |

OTHER PUBLICATIONS

Chemical abstracts accession No. 1985:561899, Richardson, "Formulating water–based epoxy paints," Pigment & Resin Technology, vol. 14, No. 4, 1985, abstract.*
Chemical abstracts accession No. 1990:120807 for Czech Patent No. 260,717 B1, Jan. 12, 1989.*
Chemical abstracts accession No. 1996:496309, Walker et al., "Recent developments in curing agents for waterborne epoxy coatings," Proceedings of the International Waterborne, High–Solids, and Powder Coatings Symposium, 23$^{rd}$, 1996, abstract.*
Anquamine® 401 Curing Agent®, Air Products, Material Safety Data Sheet, Oct. 25, 2002, pp. 1–9.
Anquamine® 701 Curing Agent®, Air products, Material Safety Data Sheet, Dec. 16, 2002, pp. 1–8.
D.E.R. 353 Epoxy Resin, The Dow Chemical Company, Material Safety Data Sheet, Date of Print: Dec. 17, 2001, 9 pages.
Anquamine® 701 Curing Agent, Air Products, Technical Bulletin, Feb. 2001, Pub. No. 125–9934.

\* cited by examiner

*Primary Examiner*—Robert Sellers
(74) *Attorney, Agent, or Firm*—DeLio & Peterson, LLC; John J. Tomaszewski

(57) ABSTRACT

A tile grout composition and method of using the tile grout composition to grout set tiles are provided. The tile grout composition is a water-based epoxy grout composition which has excellent stain and chemical resistant properties and is workable and easy to clean up after grouting the tiles. The grout composition employs a water dispersible epoxy polymer and a water compatible polyamine epoxy resin adduct as the curing agent in combination with a water repellent component. For colored grouts, a color coated filler such as sand is employed to obtain the enhanced tile grout properties. Luminescent and fluorescent additives and sparkle additives may be used in the grout to provide special visual effects in the light or dark.

10 Claims, No Drawings

WATER-BASED EPOXY GROUT

BACKGROUND OF THE INVENTION

1. Field of the Invention

The present invention relates generally to curable epoxy compositions and, in particular, to a water-based epoxy grout, which is commonly known as a tile grout.

2. Description of Related Art

In the installation of ceramic tiles and other tiles, the tiles are assembled in an edge-to-edge pattern with spaces between the tiles and it is necessary to fill the areas or joints between adjacent tiles with a bonding material. The material used to fill the joints is referred to as a pointing compound or more commonly as a tile grout. There are a variety of tile grout compounds including acrylic grout, epoxy grout and Portland and regular cement based grout. The following description will be directed to ceramic tiles for convenience.

Tile grouts, regardless of the type, are expected to provide certain properties. These properties include workability, stain resistance, forming a full grout in the spaces, uniform look and color and easy cleanup with a minimum amount of water. Workability is required to facilitate the spreading of the grout completely into the joint between adjacent tile edges without creating any voids or vacant areas. Workability is a very important tile grout property since it directly affects the ease of grouting the tile and grouts having a high workability are more cost effective since less labor is required to perform a tile grout job. The traditional grout is a cement containing grout which has high workability compared to conventional epoxy grouts.

The property of grout stain resistance is also important because ceramic tile is used both functionally and decoratively. Thus, permanent stains on either the ceramic tile or grout will detract from the decorative appearance of the installation. The face of the ceramic tile is essentially impervious and is therefore free from permanent stain. The grout should likewise be resistant to staining and also capable of withstanding scouring.

Easy cleanup is another important property of grout due to the nature of how tile grout is installed by the tile setter or contractor. Tile grout is installed after ceramic tiles are firmly set and is floated into the joints between the ceramic tile edges. Some of the excess grout will adhere to the tile's face or form a surface film and this grout must be removed from the tile's face without disturbing the grout joints. Cleanup is the source of the biggest complaint of tile setters.

While epoxy grout has a much higher resistance to staining than cement based grouts, it has been found in the field that installers will preferably employ a Portland cement based grout because it is much more workable and easier to clean up than an epoxy grout. Unfortunately, the Portland cement based grout is more susceptible to staining and generally stain badly, crack easily, and develop poor strength under dry conditions. Furthermore, these materials have poor acid and chemical resistance.

The highly preferred tile grout is now essentially a non-hydraulic grout and comprises a film-forming, water-dispersible, cross-linkable polymer and a curing agent. The preferred cross-linkable polymer is an epoxy and the epoxy grout mortars are essentially free of the undesirable properties which are characteristic of the aforementioned cement base grout compositions. In general, they have minimal shrinkage and become highly water and stain resistance after a period of time.

Unfortunately, as discussed above, epoxy grouts do not have the workability and ease of cleanup of cement based grouts and, while used in the industry, are lacking in wide acceptance by the installers of ceramic tiles. When cement based grouts are used, the grouts tend to crack and stain over time causing the owner to have to re-grout the tiles. This is expensive and time consuming.

Typically, the water-based epoxy grout system is a three-part system comprising an epoxy resin and a curing agent which is usually a polyamine or polyamido-amine and a filler powder such as sand and hydraulic cement. The amine groups react with the epoxide groups of the epoxy resin crosslinking the resin and forming a hardened grout. Hydraulic cement reacts with the water.

Amines, however, are relatively corrosive and the curing rate is hard to control and amine adducts, which are well-known in the art, have been developed as preferred epoxy resin curing agents. One amine adduct is "ANCAMINE 1769" (Trademark), an adduct of triethylenetetraamine with propylene oxide. This adduct is made by Air Products and Chemicals, Inc., Allentown, Pa.

More preferred amine adducts have been developed to conform to environmental regulations and one type may be defined as a polyamine-epoxy adduct. Basically, a polyamine-epoxy adduct is formed by reacting a polyamine with a polyepoxide resin using a molar excess of polyamine to form a polyamine terminated epoxy adduct. Free polyamine is typically removed and the adduct endcapped with an alkyl monoepoxide to eliminate the presence of primary amines. A portion of the remaining amine hydrogen atoms are then reacted with a salt forming component and a volatile organic or inorganic acid to enhance water solubility. The polyamine-epoxy adduct is emulsified in water and combined with an epoxy resin and the resultant mixture cured. Such an adduct is described in U.S. Pat. No. 4,246,184, which patent is hereby incorporated by reference.

Other polyamine-epoxy adduct products are disclosed in U.S. Pat. Nos. 5,246,984; 5,350,784; 5,475,039; 5,489,630; 5,508,324; 5,527,839; 5,536,775; 5,508,324; and 5,599,855; all of which are incorporated herein by reference.

U.S. Pat. No. 5,508,324, for example, discloses a number of patent references relating to water dispersible polyamine epoxy adducts which can be used as a curative for epoxy resin systems. In general, the water compatible polyamine adducts are formed by the reaction of a polyamine with a mixture of monoepoxide and polyepoxide. As discussed therein in U.S. Pat. No. 4,608,405, curing agents are described as based upon an epoxidized polyol containing aromatic and polyalkylene ether moieties in which all the epoxidized groups are reacted with a polyamine wherein each primary amine is further reacted with a monoepoxide or a monocarboxylic acid.

While this class of amine adduct is useful as epoxy curing agents, they are not used, as far as Applicant is aware, in water-based epoxy tile grouts. It is hypothesized that commercially acceptable grout systems have not been prepared using this class of adduct because of the difficulty in formulating a grout having overall good grout properties.

Bearing in mind the problems and deficiencies of the prior art, it is therefore an object of the present invention to provide a water-based epoxy tile grout composition containing a polyamine epoxy adduct and a non-hydraulic filler powder which grout is stain and chemical resistant, forms a full joint in the spaces and is highly workable and easy to clean up.

It is another object of the present invention to provide methods for using the tile grout in the installation of ceramic tiles and other tiles.

Still other objects and advantages of the invention will in part be obvious and will in part be apparent from the specification.

SUMMARY OF THE INVENTION

The above and other objects and advantages, which will be apparent to those skilled in art, are achieved in the present invention which is directed to, in a first aspect, a tile grout composition comprising:

a film-forming, water-dispersible, room temperature, cross-linkable epoxy polymer;

a water compatible polyamine epoxy resin adduct;

a filler, preferably a color coated filler; and a water repellent component.

In yet another aspect of the invention, a method is provided for grouting tiles with a grout comprising the steps of:

assembling a plurality of tiles in spaced relationship having spaces therebetween;

applying a tile grout composition to the spaces between the tiles the tile grout composition comprising:
a film-forming, water-dispersible, room temperature, cross-linkable epoxy polymer;
a water compatible polyamine epoxy resin adduct;
a filler, preferably a color coated filler; and
a water repellent component;

cleaning the excess tile grout composition from the tile surfaces; and allowing the tile grout composition to cure resulting in a grouted tile installation.

In another aspect of the invention the tile grout can contain a fluorescent or luminescent additive.

In still another aspect of the invention the tile grout can contain a particulate material which add sparkles and glitter to the grout.

DESCRIPTION OF THE PREFERRED EMBODIMENT(S)

The novel tile grout composition of this invention is highly effective for filling a joint (grouting) between ceramic tiles. The cured grout composition is resistant to water, chemicals (acid and solvent), forms a full grout in the spaces which is uniform and smooth, stain resistant and has excellent wetting and physical property characteristics. Moreover, the grout composition is workable and easy to apply and easy to clean from the tile surface.

The novel tile grout composition of this invention comprises:

a film-forming, water-dispersible, room temperature cross-linkable epoxy polymer;

a water compatible polyamine epoxy resin adduct;

a water repellent component; and a filler, and for colored grouts, preferably a color coated filler such as color coated sand.

The cross-linkable epoxy polymer component is capable of cross-linking or curing preferably at or about room temperature when combined with the other ingredients which make up the grout composition. The particular polymer used in the present invention is an epoxy resin which resins are very well known in the art. Any epoxy polymer can be used herein and the epoxy polymers are characterized by containing one or more 1,2-epoxide groups, preferably more than one, and the epoxy polymer or epoxy resin mixture is preferably a liquid at room temperature. The epoxy resin generally has an epoxide equivalent weight (EEW) based on solids of from about 150 to about 1,000, preferably from about 156 to about 700.

The epoxy polymer may be saturated or unsaturated, cycloaliphatic, allylcyclic, or heterocyclic and may be substituted with constituents such as halogen atoms, hydroxyl groups, ether radicals, and the like. The epoxy polymer is preferably difunctional and may also be trifunctional or polyfunctional.

Preferably, the epoxy polymer is liquid at the temperature at which the coating composition is applied, i.e., room temperature. Epoxy polymers which can be used in the coating composition of the present invention preferably include epoxy polymers containing an average of greater than one epoxy group.

The epoxy resin may be used as is, may be dissolved in an appropriate solvent, or may be employed as an already formed emulsion in water or water/cosolvent blend. It will be recognized to those skilled in the art that the use of solvent or a water/cosolvent blend may be required with solid epoxy resins or extremely viscous epoxy resins. The ratio of epoxy groups in the epoxy resins to amine hydrogen in the curing agent may vary widely and will depend on the nature of the epoxy resin employed and the properties necessary to meet the grout requirement. For the liquid resin, a preferred ratio range is about 0.9–1.3, e.g., 1:1 and most preferably an excess of epoxy is employed, i.e., 1:0.9.

A particularly preferred epoxy resin is a mixture sold by Dow Chemical Co. as D.E.R.® 353 Epoxy Resin. This resin product contains a polymer of Bisphenol-A and epichlorohydrin (CAS No. 025085-99-8) in an amount of 68 wt. %; Bisphenol-F diglycidyl ether (CAS No. 028064-14-4) in an amount of 18 Wt. %; and an alkylglycidyl ether (CAS No. 068609-97-2) in an amount of 14 wt. %. This epoxy resin mixture is preferred because of its demonstrated effectiveness.

It is well known that epoxy resins can be cross-linked with amines such as ethylene diamine, triethylene tetraamine, and the like. Amine curing agents are very well known in the art and it is an important feature of this invention that the amine used to cross-link the epoxy resin component be a water compatible polyamine epoxy resin adduct product. As will be further discussed hereinbelow, it is also preferred that when using such a polyamine epoxy resin adduct product to cross-link the epoxy resin component, that for a colored grout, a color coated filler be used in the tile grout composition. A pigment separately added to a filler material in a tile grout composition utilizing an epoxy resin and the water compatible polyamine epoxy resin adduct has been found to not provide all the enhanced properties of the tile grout of the present invention. It is however essential that a water repellent component be utilized in the tile grout composition as will be further discussed hereinbelow.

The curing agent of the present invention is a polyamine adduct and, in particular, one prepared from a polyamine and an epoxide containing material. Such polyamine epoxy resin adducts are well known in the art as exemplified in U.S. Pat. No. 5,246,984 to Darwen et al., U.S. Pat. Nos. 5,489,630 and 5,527,839 to Walker and U.S. Pat. No. 5,475,039 to B ütikofer as discussed above.

As discussed in U.S. Pat. No. 5,246,984, one polyamine-epoxide adduct comprises a blend of a water compatible resin and a resin compatible resin, with the amino groups partly converted to an amine salt. The water compatible polyamine-epoxy adduct is prepared by reacting a polyamine with a monoepoxide and one or more polyepoxides in an amount such that from about 10 to 50% of the primary amino hydrogen atoms are reacted with the monoepoxide and 5 to 65% of the primary amino hydrogens are reacted with the polyepoxide. The resin compatible polyamine-epoxide adduct is formed by reacting an aliphatic or cycloaliphatic polyamine with a monoepoxide in an amount to convert 30 to 70% of the primary amino groups. The water compatible and resin compatible polyamine-epoxy adducts are mixed to form a blend and then the amino groups remaining in the water and resin compatible polyamine-adducts are reacted with formaldehyde to form methylolated derivatives. The amount of formaldehyde to be used for methylolation should be sufficient to react with at least 25% of the available amine functionality in the blend of the water compatible and resin compatible polyamine-epoxy adducts. Once methylolated, an acid is added to the blend to partially convert the amino groups in the blend to an amine salt. The resulting blend is readily dispersible in water and is capable of dispersing liquid and solid polyepoxide resins in water.

The highly preferred curing agent used in the tile grout composition of the subject invention is ANQUAMINE 701 CURING AGENT (Trademark) sold by Air Products and Chemicals, Inc. On the Material Safety Data Sheet (MSDS), the product code for this material is HC701U. The product is described in physical form as a viscous liquid having a yellow color with an ammoniacal odor. The chemical family is described as a polyamine epoxy resin adduct emulsion. The formula is given as a polyamine-epoxy resin adduct containing less than 60% of this material with the composition being a trade secret. Physical properties as provided by Air Products and Chemicals, Inc. include that the adduct has a viscosity at 77° F. (cP) of 5,000–10,000 and an amine value (mg/KOH/g) of 130–165. The adduct has a specific gravity at 77° F. of 1.08 and an equivalent wt./{H} of 300. The total solid content in wt. % is about 53–57. When employed as a curing agent with standard-A based (DGEBA, EEW=190) epoxy resin, it is disclosed as having typical handling properties with a pot life of about 2–5 hours. The dry time (BK recorder) in hours for phase 1 is 0.75, phase 2 is 4.00 and phase is 6.50 and has a PERSOZ hardness at 24 hours of 200 and at 7 days of 350. A unique feature of this polyamine epoxy adduct is the development of a microporous structure within the cured grout even at a thickness greater than 1 inch. This feature allows the water to evaporate from the grout without the need for a water consuming material such as Portland cement.

U.S. Pat. No. 5,489,630 describes a water compatible poly(alkylene oxide) amine-epoxy adduct. The adduct is readily dispersible in aqueous media and is capable of dispersing liquid and solid polyepoxy resins in aqueous media. In the particular epoxy hardener composition adduct of the patent, the adduct product of the reaction of (A) a poly (alkylene oxide) monoamine or diamine with a molecular wt. of about 500–3,000 and (B) a di- or polyepoxide in a ratio of epoxide to active amine hydrogens of 1.1:1 to 6:1 yields an intermediate product (C). C is reacted in a second step with (D) a di- or polyamine in a ratio of active amine hydrogens to epoxide of greater than about 25 to 1.

Another polyamine polymer curing agent additive is ANQUAMINE 401 CURING AGENT (Trademark) containing less than 5% poly(oxy(methyl-1,2-ethanediyl), Alpha-(2-Aminomethylethyl)-Omega-(2-Aminomethylethoxy) (CAS #90461-10-0), less than 4% tetramethylenepentamine (TEPA) (CAS # 112-57-2) and the remaining components are a trade secret. This material is preferably used in combination with the ANQUAMINE 701.

Another component of a grout composition of the present invention is a filler, which filler is preferably sand without Portland cement. For a colored tile grout it has been found that sand used alone in combination with a separate pigment component which is mixed into the composition does not provide all the preferred enhanced grout properties of the invention. A color coated sand is highly preferred to be used and a typical color coated sand is sold by 3M Company. Another colored sand is a resin coated colored sand using a polyvinyl acetate resin in which the pigment is dispersed, then mixed with the sand, and the solvent evaporated. Broadly stated, a color coated filler such as sand comprises a pigment attached to the sand surface. Any such color coated sand or color coated filler can be used.

In general, the nature of the sand or other filler to be used will be dictated by the intended use of the grout composition. For a typical tile grout composition the sand will have a particle size of about 0.075 mm to 0.3 mm.

Colored sand products normally contain about 1% to 10% pigment, typically 2–3%.

The use of pigment and pigment dispersions are well known to those skilled in the art of coating formulations. In general, pigments are ground into the epoxy resin, the hardener, or both. Pigments may also be incorporated with the use of a pigment grinding aid or pigment dispersant which may be used in combination with the epoxy resin or the hardener or may be used alone. It is an important feature of the subject invention however, that for colored grouts, that a color coated filler product be used. Pigments added separately to the grout composition interfere with the grout properties. Any variety of water insoluble fillers may be used in the grout composition of the invention. Other fillers which may be employed are glass, such as crushed glass, quartz, silicon, barites, limestone, alumina and other like earthen materials such as mica, talc and the like. Sand is the preferred water insoluble filler. When the water insoluble filler is added to the grout composition it is combined with the other ingredients of the composition and it will be dispersed or suspended.

In addition, other ingredients which are generally used in preparing mortar and grouting compositions may also be added to the grout composition. For instance, stabilizers, foam breakers, dispersants, wetting agents, emulsifiers, fungicides, adhesion promoters and the like may be included.

An important component of the tile grout composition of the present invention is a water repellent component. It has been found that the use of a water repellent component in combination with the polyamine epoxy adduct provides the enhanced properties of the tile grout composition. The preferred water repellent component is termed Aqua Bead 270E (Trademark) sold by Micro Powders, Inc. This component is a white milky emulsion containing 40.0%±1.0% solids. It has a viscosity of 200–500 cps, a pH of 9.5–10.3 and a density of 0.96. Chemically the product contains refined paraffin wax (CAS No. 64742-51-4), polyethylene wax (CAS No. 68441-17-8) and emulsifiers. Other suitable water repellent components such as a silicon emulsion named BS 1306 (Trademark) sold by Wacker Co. and micronized wax sold by Lubrizol Co. can likewise be used. In general, the water repellent component is any suitable hydrophobic material.

The grout composition of the present invention can be mixed from the components thereof using conventional methods and equipment. Preferably, three components are separately prepared, packaged and stored and then subsequently transported to the application site where each of the three components are mixed together in proportion to provide the grout composition. In one product, a first component termed A contains the polyamine epoxy adduct curing agent, water, antifoam agent and the water repellent additive. A second component termed B is the epoxy component and contains a liquid epoxy resin, a UV stabilizer and a silane adhesion promoter. The final third component, C, is the filler and other additives such as glitter (sparkle), fluorescent materials, luminescent materials and the like.

Preferably, when mixed on site, components A and B are first mixed together. Then component C is added and made into a workable mass. The grout product is then ready to be applied to the spaces between the set ceramic tiles.

In general, the proportions of components in the grout composition in weight % is as follows:

| Component | % Wt |
|---|---|
| epoxy polymer | 3 to 10, preferably 5 to 6. |
| polyamine epoxy adduct product | 3 to 12, preferably 6 to 8. |
| filler (water insoluble) | 60 to 85, preferably 75 to 80. |
| water repellent component | 0.5 to 5, preferably 1 to 2. |
| water | 3 to 15, preferably 5 to 8. |

The % solids of the grout of the invention based on weight and the adduct, water repellent component and water is about 20%–40%, preferably about 25%–35%, e.g., 31%. At high solids level the grout loses some of its workability properties and at low solids level poorer physical properties are obtained.

The water compatible polyamine epoxy adduct curing agent is generally used in a 1:1 ratio of active equivalents with the material to be cured although a wide range of activity ratios may be used. If excess of the polyamine epoxy adduct curing agent is present, the physical properties of the curing material, e.g., tensile strength, tend to develop faster, however, the presence of unreacted amine can decrease chemical resistance of the cured composition. If less than an equivalent amount of curing agent is used, a polymer which is not fully cured is obtained. The "cured" epoxy polymer may require post-cure for full development of physical properties. In general, it is preferred that the adduct curing agent be present in an amount less than needed to substantially react all the 1,2-epoxy groups of the epoxy resin component, e.g., a molar ratio of amine to epoxide groups of 0.9:1 although a ratio of 0.9:1 to 1.1:1, e.g., to 1:1 may suitably be used.

The grouting composition of the present invention may be applied by any method known in the art including a trowel, rubber float, squeegee, or cartridge dispenser.

The grout composition of the present invention may be used to grout a large variety of ceramic surfaces including non-skid surfaces, smooth surfaces, and the like. The tiles will normally be ceramic tiles but may also be marble, granite, limestone, mason block, and stone. In general, any ceramic surface requiring a grout can be used with the grout composition of the present invention.

Various embodiments of the present invention will now be illustrated by reference to the following specific examples. It is to be understood, however, that such examples are represented for purposes of illustration only, and the present invention is in no way to be deemed as limited thereby.

EXAMPLE I

The following components were mixed together in weight % forming a trowelable mass. The mole ratio of amine groups to epoxy groups is about 1:1. The mass was floated into spaces between sets of ceramic tiles and evaluated for a number of properties as indicated below.

| COMPONENT | |
|---|---|
| ANQUAMINE 701 (Trademark) | 47.5 |
| WATER | 39.0 |
| ANTI-FOAM | 1.4 |
| WATER REPELLENT AQUA BEAD 270E (Trademark) | 12.1 |
| SAND (COLORED) | 502 |
| EPOXY D.E.R. 353 | 33.4 |

The % solids by weight based on the components other than sand and epoxy is 31%. On a scale of 1 to 10 with 1 being unsatisfactory and 10 being excellent, the above tile grout composition of the invention had a workability rating of 10 and a clean-up rating of 10.

Comparative runs using a commercial epoxy grout had a workability rating of 1 and a clean-up rating of 1–3. A commercial cement grout had a workability rating of 9 and a clean-up rating of 9.

The above grout had the following properties:

| | |
|---|---|
| Water cleanability (ANSI A118.3 E5.1) | Pass |
| Sag Resistance (ANSI A118.3 E5.4) | Pass |
| Compressive Strength (ASTM D695 - 7 days) | 8200 psi (56.6 Mpa) |
| Thermal Shock resistance (ANSI A118.3 E5.8) | 600 psi (4.1 Mpa) |
| Shrinkage | 0.04% |

The above grout had the following working properties:

| | |
|---|---|
| Working Time | 30–45 minutes |
| Time to Foot Traffic | 12 hours |
| Time to Heavy Traffic | 24 hours |
| Wet Density | 14.2 lbs./gal. |

The above grout was also intact and had a visually good appearance after immersion for 1 month in sulfuric acid (50%), lactic acid (10%), KOH (45%), formic acid (5%), acetic acid (10%), acetic acid (20%) and nitric acid (30%).

EXAMPLE II

Comparative runs using a pigment added to the grout composition provided a workability rating and clean-up rating of 9. When a color coated sand was used, a workability rating and clean-up rating of 10 was obtained.

While the present invention has been described with relation to epoxy resins, it will be understood by those skilled in the art that other suitable film-forming, water-dispersible, room temperature cross-linkable polymers requiring or using an amine as a curing agent can be employed in the grout composition of the present invention. Such polymers include acrylic polymers, polyesters, and the like.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tile grout composition comprising:
   a film-forming, water-dispersible, room temperature, cross-linkable epoxy polymer;
   a water compatible polyamine epoxy resin adduct;
   a filler; and
   a water repellent component selected from the group of a mixture of paraffin wax and polyethylene wax, a silicon containing emulsion and micronized wax.

2. The tile grout of claim 1 wherein the filler is a color coated sand.

3. The tile grout of claim 2 wherein the water repellent component is a mixture of paraffin wax and polyethylene wax.

4. The tile grout of claim 2 wherein the water repellent component is a silicon containing emulsion.

5. The tile grout of claim 2 wherein the water repellent component is micronized wax.

6. A method for grouting tiles with a grout comprising the steps of:
   assembling a plurality of tiles in spaced relationship having spaces therebetween;
   applying a tile grout composition to the spaces between the tiles the tile grout composition comprising:
      a film-forming, water-dispersible, room temperature, cross-linkable epoxy polymer;
      a water compatible polyamine epoxy resin adduct;
      a filler; and
      a water repellent component selected from the group consisting of a mixture of paraffin wax and polyethylene, a silicon containing emulsion and micronized wax;
   cleaning the excess tile grout composition from the tile surfaces; and
   allowing the tile grout composition to cure resulting in a grouted tile installation.

7. The method of claim 6 wherein the filler is a color coated sand.

8. The method of claim 7 wherein the water repellent component is a mixture of paraffin wax and polyethylene wax.

9. The method of claim 7 wherein the water repellent component is a silicon containing emulsion.

10. The method of claim 7 wherein the water repellent component is micronized wax.

* * * * *